US010621336B2

(12) United States Patent
Xing et al.

(10) Patent No.: US 10,621,336 B2
(45) Date of Patent: Apr. 14, 2020

(54) TECHNOLOGIES FOR SOFTWARE ATTACK DETECTION USING ENCODED ACCESS INTENT

(71) Applicant: Intel Corporation, Santa Clara, CA (US)

(72) Inventors: Bin Xing, Hillsboro, OR (US); Krystof C. Zmudzinski, Forest Grove, OR (US); Wei Wu, Portland, OR (US); Shih-Lien L. Lu, Portland, OR (US); Carlos V. Rozas, Portland, OR (US); Francis X. McKeen, Portland, OR (US); Siddhartha Chhabra, Hillsboro, OR (US); Mark W. Shanahan, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 399 days.

(21) Appl. No.: 14/866,856

(22) Filed: Sep. 26, 2015

(65) Prior Publication Data

US 2017/0091445 A1    Mar. 30, 2017

(51) Int. Cl.
*G06F 12/14*    (2006.01)
*G06F 21/53*    (2013.01)

(52) U.S. Cl.
CPC ........ *G06F 21/53* (2013.01); *G06F 2221/033* (2013.01)

(58) Field of Classification Search
CPC ....... G06F 2212/1052; G06F 2212/403; G06F 11/08; G06F 11/1076; G06F 11/1004;

(Continued)

(56) References Cited

U.S. PATENT DOCUMENTS 4,811,347 A * 3/1989 Bolt .................... G06F 11/1008
714/805
7,814,300 B2 * 10/2010 Moyer .................. G06F 9/3004
712/219

(Continued)

FOREIGN PATENT DOCUMENTS

WO    WO-2013129752 A1 *  9/2013  .......... H03M 13/095

OTHER PUBLICATIONS

International search report for PCT application No. PCT/US2016/048959, dated Nov. 26, 2016 (5 pages).

(Continued)

*Primary Examiner* — Farid Homayounmehr
*Assistant Examiner* — Lizbeth Torres-Diaz
(74) *Attorney, Agent, or Firm* — Barnes & Thornburg LLP

(57) ABSTRACT

Technologies for software attack detection include a computing device with a processor and a memory external to the processor. The processor originates a memory transaction with an associated secure enclave status bit that indicates whether the memory transaction originated in a secure execution mode, such as from a secure enclave. The processor computes an error-correcting code (ECC) based as a function of memory transaction data and the secure enclave status bit, and performs the memory transaction based on the ECC and the memory transaction data using the memory of the computing device. The processor may store the ECC and the memory transaction data to memory. The processor may load a stored ECC and data from the memory and compare the computed ECC to the stored ECC to detect memory transactions with an invalid secure enclave status bit. Other embodiments are described and claimed.

19 Claims, 6 Drawing Sheets

(58) Field of Classification Search
CPC .............. G06F 11/1048; G06F 9/3004; G06F 11/1044; G06F 3/0619; G06F 11/10; G06F 2211/109; G06F 21/57; G06F 21/74; G06F 2221/2105; G06F 21/53; H04L 1/0072

See application file for complete search history.

(56) References Cited

U.S. PATENT DOCUMENTS

| | | | |
|---|---|---|---|
| 8,055,978 B2 | 10/2011 | Kim et al. | |
| 2004/0103299 A1* | 5/2004 | Zimmer | G06F 21/57 726/26 |
| 2008/0184086 A1* | 7/2008 | Kim | G06F 11/073 714/746 |
| 2008/0215953 A1* | 9/2008 | Deierling | H03M 13/17 714/759 |
| 2009/0293130 A1* | 11/2009 | Henry | G06F 21/74 726/26 |
| 2010/0082927 A1* | 4/2010 | Riou | G06F 12/1433 711/163 |
| 2011/0276846 A1* | 11/2011 | Orbach | G06F 11/1048 714/718 |
| 2014/0047296 A1* | 2/2014 | Motabar | G06F 11/1048 714/758 |
| 2017/0091445 A1* | 3/2017 | Xing | G06F 21/53 |
| 2018/0321875 A1* | 11/2018 | David | G06F 11/1076 |
| 2018/0323808 A1* | 11/2018 | David | G06F 11/1076 |

OTHER PUBLICATIONS

Written opinion for PCT application No. PCT/US2016/048959, dated Nov. 26, 2016 (10 pages).

\* cited by examiner

TECHNOLOGIES FOR SOFTWARE ATTACK DETECTION USING ENCODED ACCESS INTENT

BACKGROUND

Current processors may provide support for a trusted execution environment such as a secure enclave. Secure enclaves include segments of memory (including code and/or data) protected by the processor from unauthorized access including unauthorized reads and writes. Additionally, the processor can cryptographically prove that a particular secure enclave is authentic and unaltered.

Certain secure enclave implementations provide full cryptographic protection of enclave memory, including confidentiality, integrity, and replay protection. Full cryptographic protection may require the processor to store additional data such as counters and authentication tags, which may impose a storage overhead for enclave memory. Additionally, certain secure enclave implementations use a range register to identify physical memory reserved to be used by secure enclaves, which is typically referred to as an enclave page cache (EPC). The range register typically must be set in a pre-boot firmware environment and thus the size of the EPC may not be changed at runtime.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
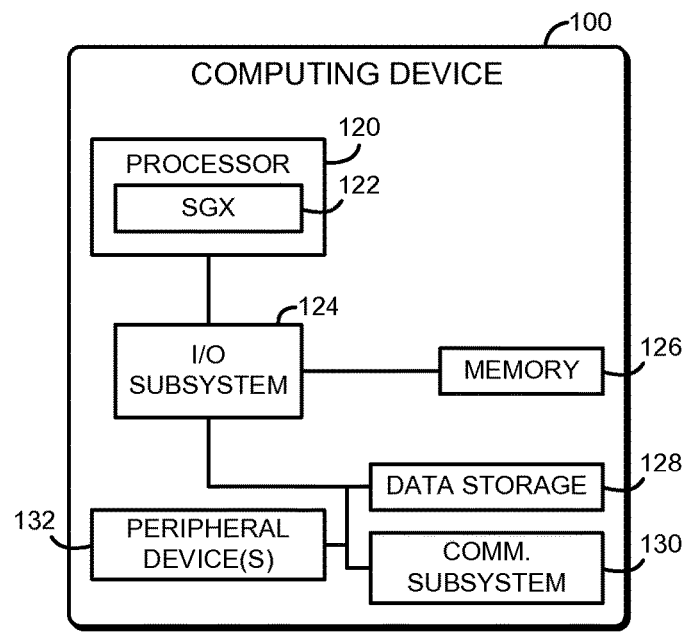
FIG. 1 is a simplified block diagram of at least one embodiment of a computing device for software attack detection.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Referring now to FIG. 1, in an illustrative embodiment, a computing device 100 for software attack detection includes a processor 120 with secure enclave support 122. In use, as described in more detail below, the processor 120 of the computing device 100 generates memory transactions with associated secure enclave status bits. When the memory transaction is generated from a secure enclave, the secure enclave status bit is set. Therefore, the secure enclave status bit indicates the access intent of the memory transaction. The processor 120 computes an error-correcting code as a function of the memory transaction data combined with the secure enclave status bit. For write transactions, the error correcting code and the data may be stored in main memory, without storing the secure enclave status bit. For read transactions, the computed error-correcting code may be compared to the error-correcting code stored in the memory to detect memory transactions with an invalid access intent. Thus, the computing device 100 may detect invalid access intents for any location in the memory 126, without relying on range registers to identify a pre-allocated secure memory partition. Additionally, the computing device 100 may detect invalid access intents without the storage overhead associated with integrity- and replay-protection mechanisms such as counters and authentication tags. Further, the computing device 100 may use ordinary ECC memory commonly used in server devices.

The computing device 100 may be embodied as any type of computation or computer device capable of performing the functions described herein, including, without limitation, a server, a workstation, a computer, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 124, a memory 126, a data storage device 128, and communication circuitry 130. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As described above, the processor 120 includes secure enclave support 122. The secure enclave support 122 allows the processor 120 to establish a trusted execution environment often referred to as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or in the main memory 126. The secure enclave support 122 may be embodied as a set of processor instruction extensions that allows the processor 120 to establish one or more secure enclaves in the memory 126. For example, the secure enclave support 122 may be embodied as Intel® Software Guard Extensions (SGX) technology.

The memory 126 may be embodied as any type of volatile or non-volatile memory or data storage capable of performing the functions described herein. In operation, the memory 126 may store various data and software used during operation of the computing device 100 such as operating systems, applications, programs, libraries, and drivers. As described above, the memory 126 may store encrypted code and data associated with one or more secure enclaves. For example, the memory 126 may be used as a backing store for an enclave page cache (EPC) or other protected memory of the processor 120. The memory 126 is communicatively coupled to the processor 120 via the I/O subsystem 124, which may be embodied as circuitry and/or components to facilitate input/output operations with the processor 120, the memory 126, and other components of the computing device 100. For example, the I/O subsystem 124 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. In some embodiments, the data storage device 128 may be used to store the contents of one or more secure enclaves. When stored by the data storage device 128, the contents of the secure enclave may be encrypted to prevent unauthorized access.

The communication circuitry 130 of the computing device 100 may be embodied as any communication circuit, device, or collection thereof, capable of enabling communications between the computing device 100 and other remote devices over a network. The communication circuitry 130 may be configured to use any one or more communication technology (e.g., wired or wireless communications) and associated protocols (e.g., Ethernet, Bluetooth®, Wi-Fi®, WiMAX, etc.) to effect such communication.

In some embodiments, the computing device 100 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

Figure 2:
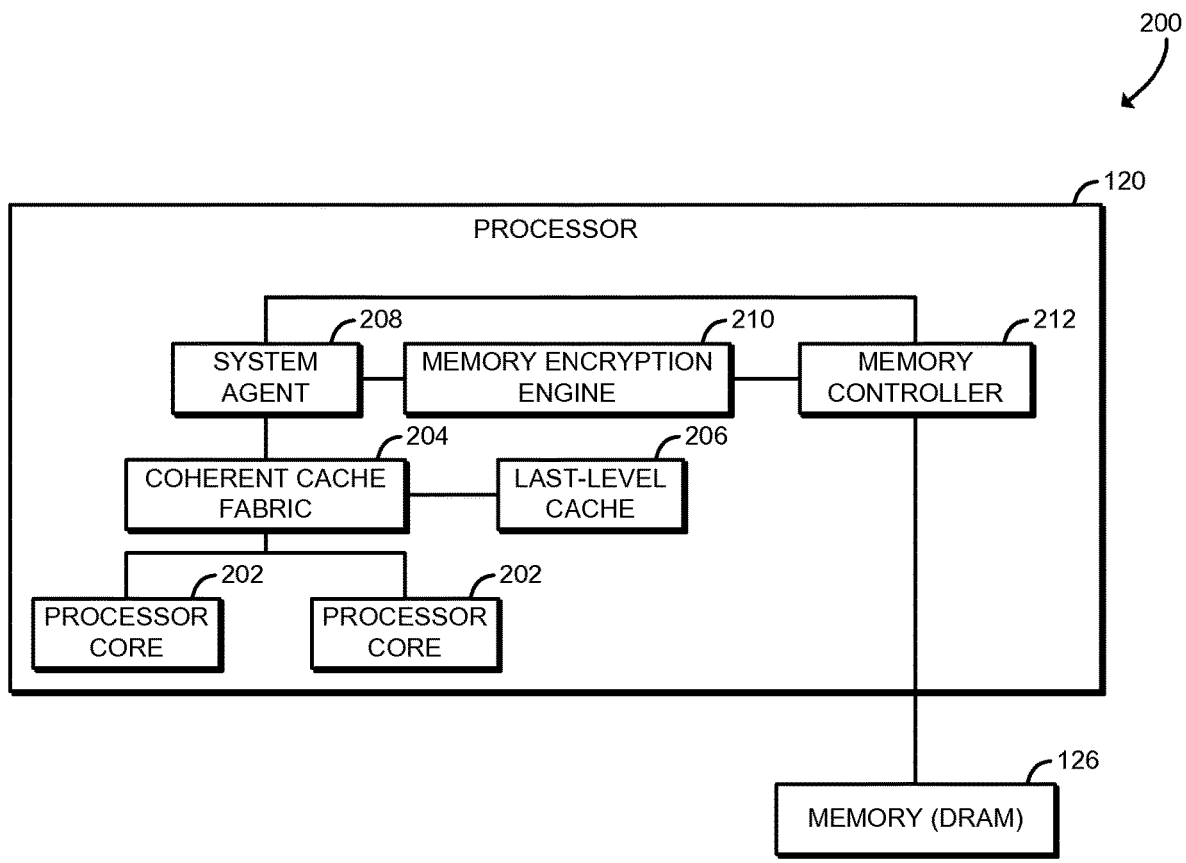
FIG. 2 is a simplified block diagram of at least one embodiment of a processor and memory of the computing device of FIG. 1.

Referring now to FIG. 2, a schematic diagram 200 illustrates one potential embodiment of the processor 120 and the memory 126 of the computing device 100. The illustrative processor 120 includes two processor cores 202, each of which is an independent processing unit capable of executing programmed instructions. Although the illustrative processor 120 includes two processor cores 202, in other embodiments the processor 120 may include a different number of processor cores 202. Each processor core 202 may originate memory transactions (e.g., read transaction or write transactions) in response to executing certain programmed instructions. Each core 202 also sets and/or clears a secure enclave status bit signal based on the access intent of the instruction that originates the memory transaction. The access intent indicates the intention of the memory transaction to access secure memory. For example, the core 202 may set the secure enclave status bit signal when the transaction originates from a secure enclave and clear the secure enclave status bit signal when the transaction originates from outside of the secure enclave. A coherent cache fabric 204 coupled to the cores 202 forwards transactions to a last-level cache 206 and a system agent 208. The last-level cache 206 may store data associated with memory transactions, including the secure enclave status bit. The system agent 208 forwards transactions with the secure enclave status bit to a memory encryption engine 210 or a memory controller 212 based on the access intent of the transaction. For example, the system agent 208 may forward a transaction to the memory encryption engine 210 if the secure enclave status bit is set or to the memory controller 212 if the secure enclave status bit is cleared. The memory encryption engine 210 is configured to perform one or more cryptographic operation based on the memory transactions, including encrypting data, decrypting data, and/or generating integrity- and replay-protection data. The memory controller 212 performs memory transactions, including reading data from the memory 126, writing data to the memory 126, and/or calculating and verifying error correcting codes. For example, the memory controller 212 may execute a method for performing memory transactions as described further below in connection with FIGS. 5A and 5B.

Figure 3:
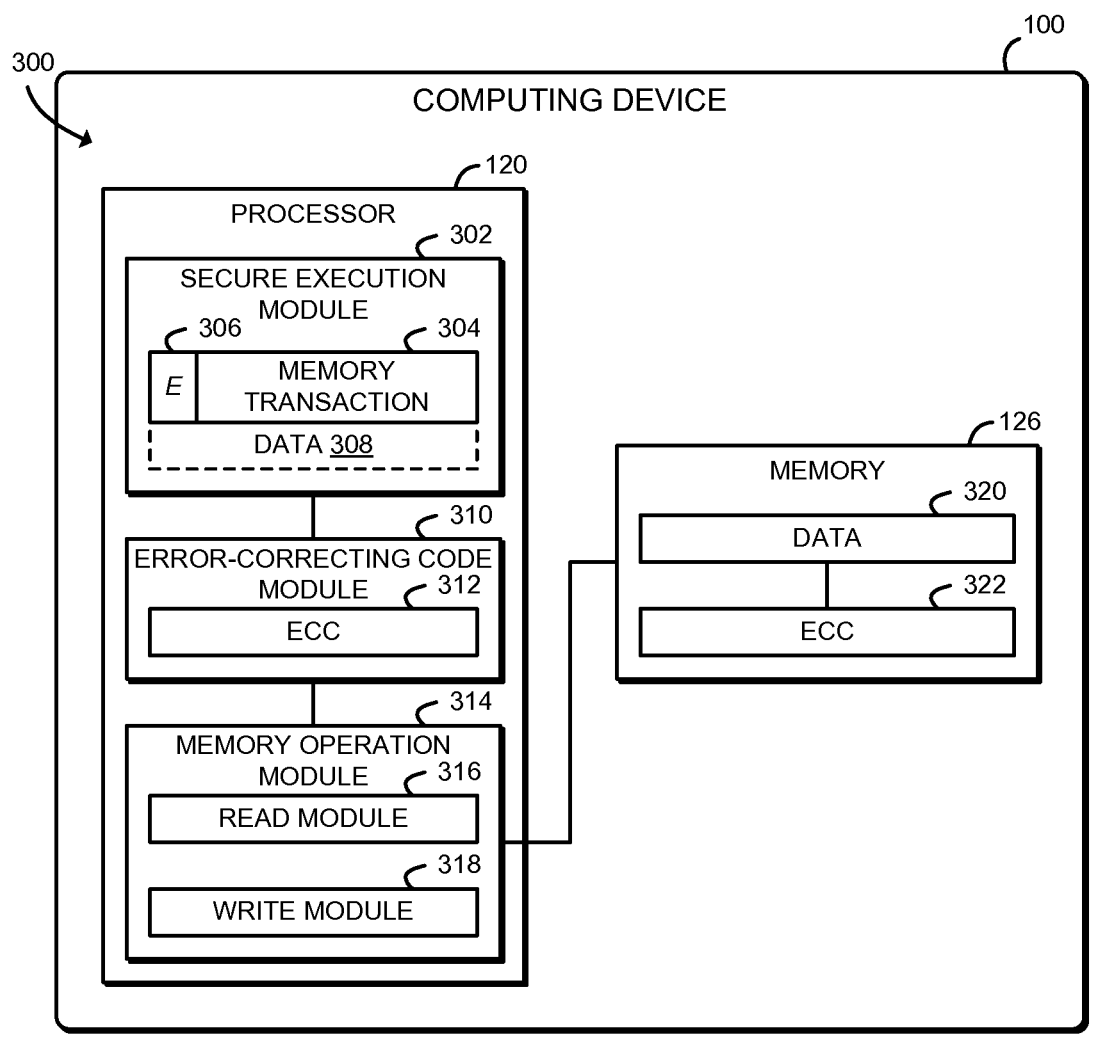
FIG. 3 is a simplified block diagram of at least one embodiment of an environment that may be established by the computing device of FIGS. 1-2.

Referring now to FIG. 3, in an illustrative embodiment, the computing device 100 establishes an environment 300 during operation. The illustrative environment 300 includes a secure execution module 302, an error correcting code module 310, and a memory operation module 314. The various modules of the environment 300 may be embodied as hardware, firmware, microcode, software, or a combination thereof. As such, in some embodiments, one or more of the modules of the environment 300 may be embodied as circuitry or collection of electrical devices (e.g., secure execution circuitry 302, error correcting code circuitry 310, and/or memory operation circuitry 314). It should be appreciated that, in such embodiments, one or more of the secure execution circuitry 302, the error correcting code circuitry 310, and/or the memory operation circuitry 314 may form a portion of one or more of the processor 120 (e.g., the processor cores 202 and/or the memory controller 212), the I/O subsystem 124, and/or other components of the computing device 100. Additionally, in some embodiments, one or more of the illustrative modules may form a portion of another module and/or one or more of the illustrative modules may be independent of one another.

The secure execution module 302 is configured to originate, by the processor 120, a memory transaction 304 and an associated secure enclave status bit 306. The enclave bit 306 may be embodied as any processor signal, processor flag, status bit, or other signal that indicates whether the memory transaction 304 was originated by the processor 120 in a secure execution mode, such as from a secure enclave established using Intel® SGX technology. Thus, the enclave bit 306 indicates the access intent of the memory transaction 304. In the illustrative embodiment, the memory transaction 304 may be embodied as a write transaction or a read transaction. Write transactions 304 may also include or otherwise be associated with data 308. The data 308 may be plaintext data or encrypted data, for example data encrypted by the memory encryption engine 210 when the memory transaction 304 originates in the secure execution mode.

The error correcting code module 310 is configured to compute an error-correcting code (ECC) 312 as a function of the memory transaction data 308 and the secure enclave status bit 306. For example, for a write transaction, the error correcting code module 310 may be configured to compute the ECC 312 based on the data 308 included in the memory transaction 304, and for a read transaction, the error correcting code module 310 may be configured to compute the ECC 312 based on data 320 read from the memory 126. In the illustrative embodiment, the ECC 312 is computed using a single-error correction and double-error detection (SECDED) error-correcting code scheme.

The memory operation module 314 is configured to perform the memory transaction 304 based on the error-correcting code (ECC) 312 and the memory transaction data 308 using the memory 126 of the computing device 100. For example, for a write transaction 304, the memory operation module 314 may be configured to write the data 308 and the ECC 312 to the memory 126. As another example, for a read transaction 304, the memory operation module 314 may be configured to read data 320 and an error-correcting code (ECC) 322 from the memory 126 and determine whether the ECC 312 computed by the error correcting code module 310 matches the ECC 322 stored in the memory 126. As described further below, if the ECCs 312, 322 do not match, the memory operation module 314 may be configured to generate an error condition such as a machine check exception. In some embodiments, those functions may be performed by one or more sub-modules, such as a read module 316 and/or a write module 318.

Figure 4:
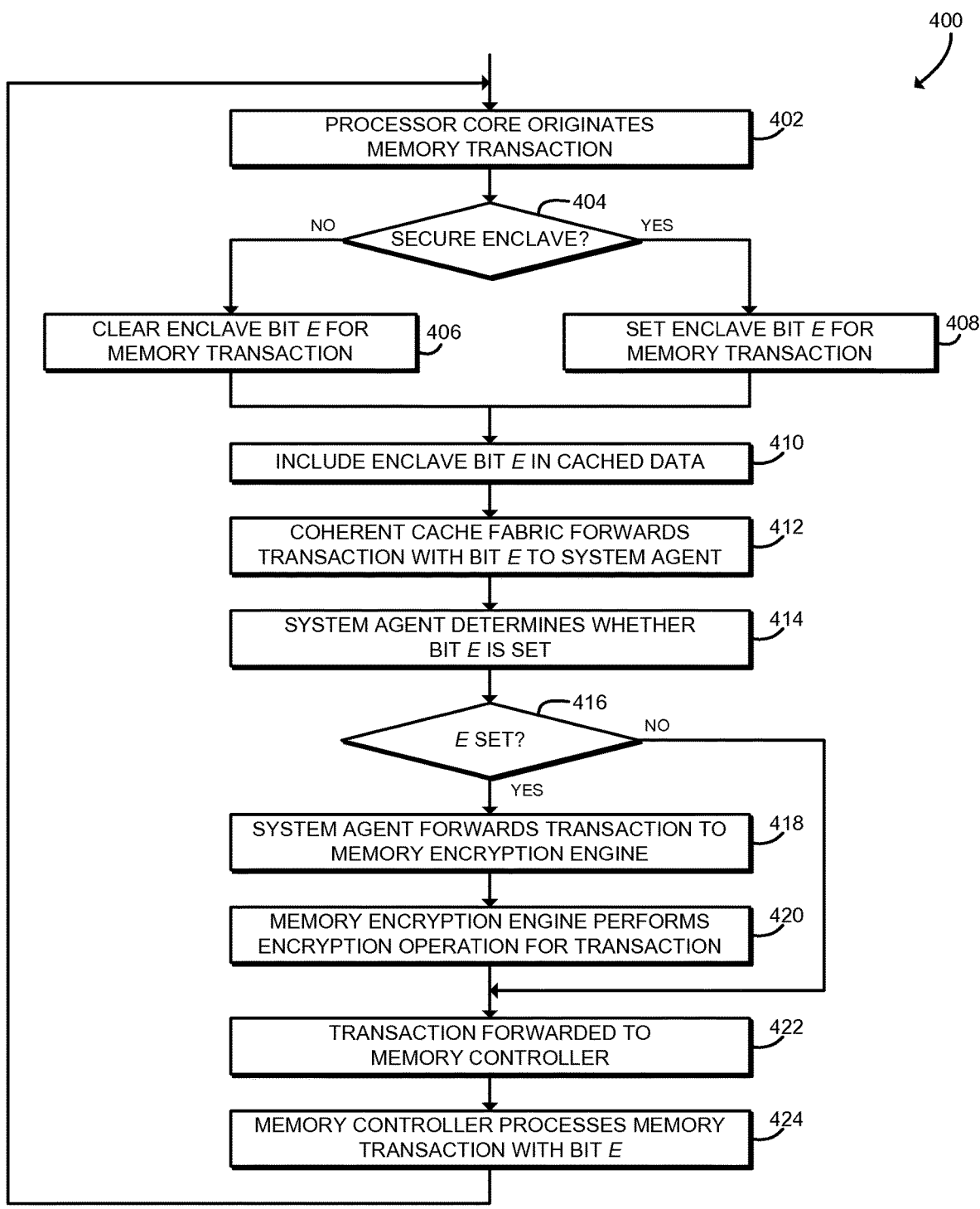
FIG. 4 is a simplified flow diagram of at least one embodiment of a method for software attack detection that may be executed by the computing device of FIGS. 1-3.

Referring now to FIG. 4, in use, the computing device 100 may execute a method 400 for software attack detection. The method 400 begins with block 402, in which a processor core 202 of the computing device 100 originates a memory transaction 304. The memory transaction 304 may include a read transaction or a write transaction. The memory transaction 304 may be originated, for example, in response to the processor core 202 executing one or more programmed instructions as part of a computer program.

In block 404, the processor core 202 of the computing device 100 determines whether the memory transaction 304 originates from a secure enclave or other appropriate secure execution environment and/or secure execution mode of the processor 120. For example, the processor core 202 may determine whether the memory transaction 304 originates from a secure enclave established using Intel® SGX technology. If the memory transaction 304 does not originate from a secure enclave, the method 400 branches to block 406, in which the processor core 202 clears the enclave bit 306 associated with the memory transaction 304. If the memory transaction 304 originates from a secure enclave, the method 400 branches to block 408, in which the processor core 202 sets the enclave bit 306 associated with the memory transaction 304. The processor core 202 sets and/or clears the enclave bit 306 using hardware, firmware, microcode, or other resources of the processor 120. User and system software (e.g., executable programmed instructions) executed by the processor 120 may not be capable of modifying the enclave bit 306. After setting and/or clearing the enclave bit 306 in blocks 406, 408, the method proceeds to block 410.

In block 410, the processor 120 includes the enclave bit 306 in any cached data associated with the memory transaction 304. For example, the processor 120 may include the enclave bit 306 in the last-level cache 206 or in any local caches of the processor cores 202. The processor 120 may use any technique to include the enclave bit 306 in the cached data. For example, the processor 120 may include a hardware enclave bit 306 in each cache line of the last-level cache 206. As another example, the processor 120 may store one or more representations of the enclave bit 306 in a specialized memory or in the cache memory itself.

In block 412, the coherent cache fabric 204 of the computing device 100 forwards the memory transaction 304 with the enclave bit 306 to the system agent 208. The coherent cache fabric 204 may forward the memory transaction 304 using any bus, interconnect, or other communication technique. In block 414, the system agent 208 of the computing device 100 determines whether the enclave bit 306 associated with the memory transaction 304 is set. If the enclave bit 306 is set, then the memory transaction 304 originated from a secure enclave or other secure execution environment and/or secure execution mode of the processor 120. Thus, by examining the enclave bit 306, the system agent 208 determines the access intent of the memory transaction 304. that is, whether the memory transaction 304 is intended to access secure memory. In block 416, the computing device 100 checks whether the enclave bit 306 is set. If not, the method 400 branches ahead to block 422, described below. If the enclave bit 306 is set, the method 400 advances to block 418.

In block 418, the system agent 208 forwards the memory transaction 304 to the memory encryption engine 210. After being forwarded to the memory encryption engine 210, the memory encryption engine 210 may perform further processing of the memory transaction 304. In block 420, the memory encryption engine 210 of the computing device 100 performs an encryption operation for the memory transaction 304. For example, for a write memory transaction 304, the memory encryption engine 210 may encrypt the data 308 included in the memory transaction 304 to generate encrypted data. As another example, for a read memory transaction 304 the memory encryption engine 210 may decrypt encrypted data 320 read from the memory 126 to generate the data 308 associated with the memory transaction 304. The memory encryption engine 210 may perform the encryption operation using encryption keys, certificates, or other cryptographic information associated with the secure enclave established by the processor 120. For example, the memory encryption engine 210 may encrypt or decrypt the data using a 128-bit encryption key. In some embodiments, the memory encryption engine 210 may perform additional cryptographic operations, including generating one or more counters and/or authentication tags to provide integrity and replay protection.

In block 422, the computing device 100 forwards the memory transaction 304 to the memory controller 212. For example, as described above in connection with block 416, if the enclave bit 306 is not set, the system agent 208 may forward the memory transaction 304 directly to the memory controller 212 without encryption. As another example, as described above in connection with blocks 416 through 420, the memory encryption engine 210 may forward the memory transaction 304 to the memory controller 212.

In block 424, the memory controller 212 of the computing device 100 processes the memory transaction 304 with the enclave bit 306. For a write memory transaction 304, the memory controller 212 may generate an error-correcting code (ECC) 312 as a function of the data 308 and the enclave bit 306 associated with the memory transaction 304. The memory controller 212 may in turn write the data 308 and the ECC 312 to the memory 126 as the data 320 and the ECC 322, respectively. Additionally or alternatively, for a read transaction 304, the memory controller 212 may read the data 320 and the ECC 322 from the memory 126, and then generate an ECC 312 as a function of the data 320 and the enclave bit 306. The memory controller 212 may compare the calculated ECC 312 to the ECC 322 read from the memory 126 to detect and/or prevent attempted software attacks. For example, potential software attacks include attempts to access secure enclave data from outside of a secure enclave (with an invalid access intent). If the data 320 and associated ECC 322 were stored by a memory transaction 304 originating from a secure enclave, then the ECC 312 calculated for a memory transaction 304 that does not originate from a secure enclave would not match the ECC 322, and the potential software attack may be detected. One potential embodiment of a method for processing the memory transaction 304 with the enclave bit 306 is described below, in connection with FIGS. 5A and 5B. After processing the memory transaction 304, the method 400 loops back to block 402 to process another memory transaction 304.

Figure 5A:
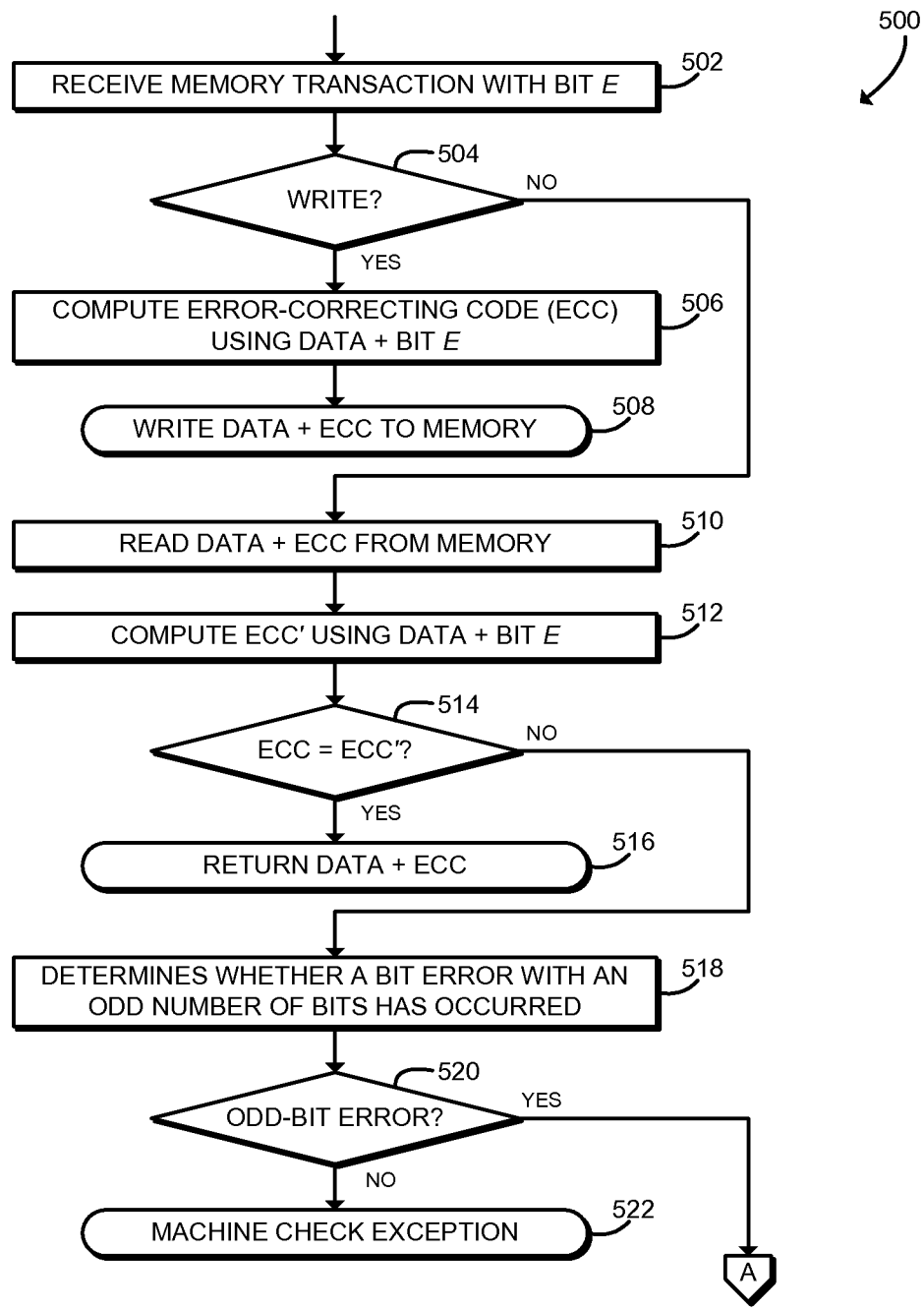
FIGS. 5A and 5B are a simplified flow diagram of at least one embodiment of a method for memory transaction processing that may be executed by the computing device of FIGS. 1-3.
Figure 5B:
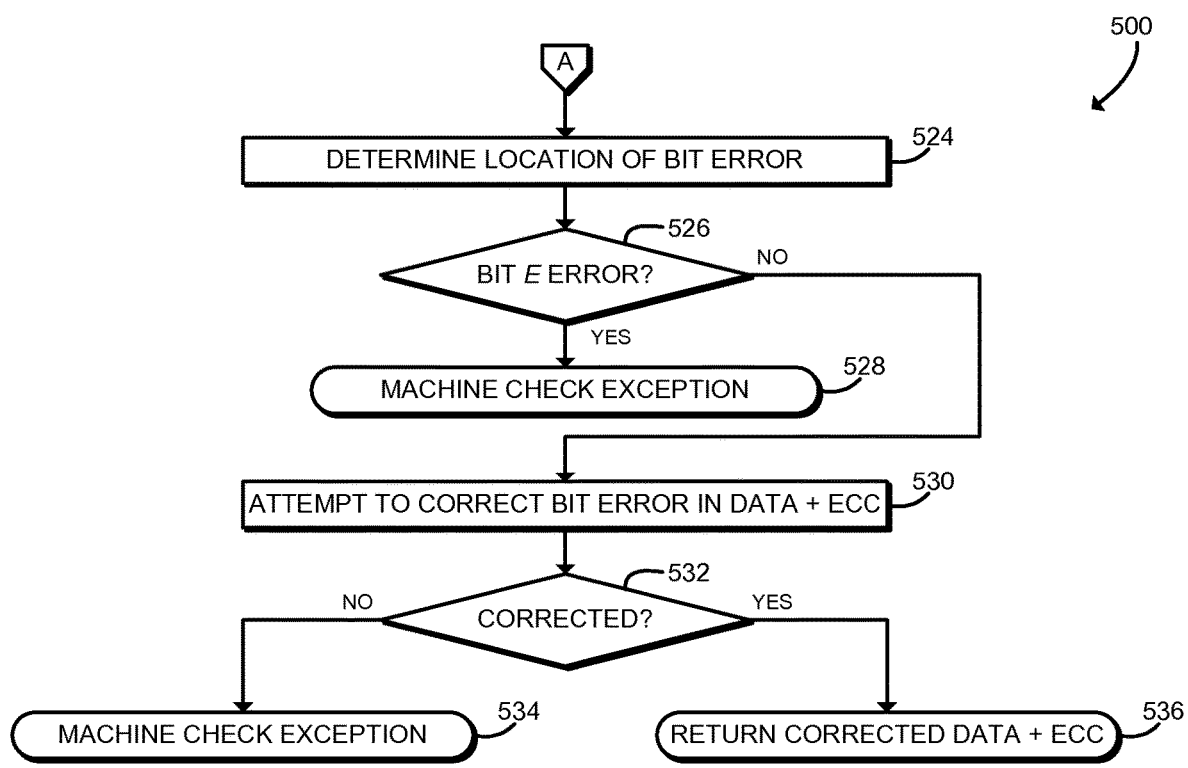

Referring now to FIGS. 5A and 5B, in use, the computing device 100 may execute a method 500 for performing a memory transaction 304. The method 500 may be executed, for example, by the memory controller 212 of the processor 120 and/or by other hardware, firmware, microcode, or other resources of the processor 120. The method 500 begins in block 502, in which the computing device 100 receives a memory transaction 304 that includes or is otherwise associated with an enclave bit 306. The memory transaction 304 may also include or be associated with data 308. For example, a write transaction 304 may include data 308 to write to the memory 126. As described above in connection with FIG. 4, the memory transaction 304 may be forwarded to the memory controller 212 from the system agent 208 and/or the memory encryption engine 210, and the memory transaction 304 may read and/or write encrypted data.

In block 504, the computing device 100 determines whether the memory transaction 304 is a write transaction. If not (i.e., if the memory transaction 304 is a read transaction), then the method 500 branches ahead to block 510, described below. If the memory transaction 304 is a write transaction, the method 500 advances to block 506.

In block 506, the computing device 100 computes an error-correcting code (ECC) 312 as a function of the data 308 of the memory transaction 304 and the enclave bit 306. For example, the computing device 100 may append the enclave bit 306 to the data 308 and calculate the ECC 312 based on the combined bit values. In the illustrative embodiment, the computing device 100 calculates the ECC 312 using a single-error correction and double-error detection (SECDED) scheme. In particular, for every 64 bits of data 308 and one bit of the enclave bit 306 (i.e., 65 total bits), the computing device 100 calculates an eight-bit ECC 312 that includes seven bits of Hamming code and one bit of parity. Note that seven bits of Hamming code is capable of error-correcting up to 127 total bits (that is, the capacity of a seven-bit Hamming code is 127 bits). The illustrative embodiment includes 72 bits to be corrected, including the 64 data bits, the enclave bit 306, and the seven Hamming bits, which is well below the capacity of the seven-bit Hamming code. In other embodiments, the computing device 100 may use any appropriate number of data bits and/or ECC bits such that the number of bits to be corrected (the data bits, the Hamming bits, and the enclave bit) is less than the maximum capacity supported by the ECC 312.

In block 508, the computing device 100 writes the data 308 of the memory transaction 304 and the calculated ECC 312 to the memory 126. As shown in FIG. 3, the data 308 and the ECC 312 may be stored in the memory 126 as the data 320 and the ECC 322, respectively. As described above, the data 320 stored in the memory 126 may include encrypted data that is protected from accesses outside of a secure enclave. After writing the data 320 and the ECC 322 to the memory 126, the method 500 is completed. Note that the computing device 100 does not write the value of the enclave bit 306 to the memory 126. As described above in connection with FIG. 4, after processing the memory transaction 304, the computing device 100 may continue to process additional memory transactions 304. For example, the computing device 100 may perform eight write transactions 304 of sixty-four data bits each to write an entire cache line of 64 bytes.

Figure 6:
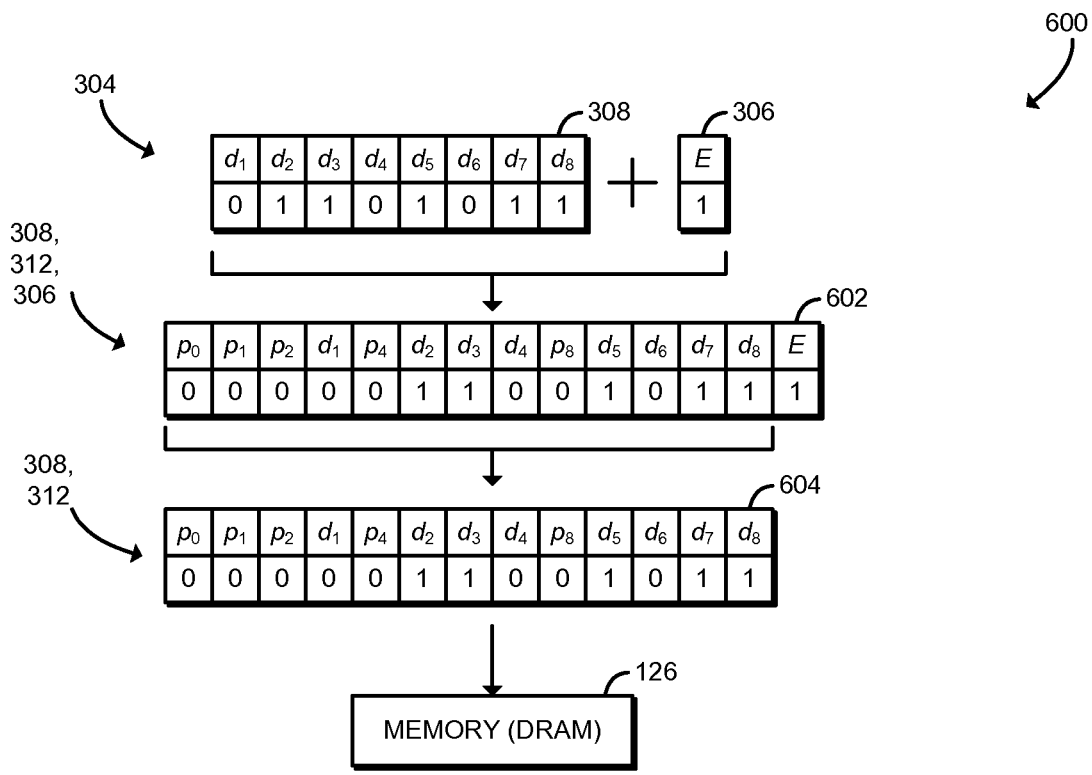
FIG. 6 is a schematic diagram illustrating a memory transaction that may be processed by the methods of FIGS. 4, 5A, and 5B.

Referring now to FIG. 6, a schematic diagram 600 illustrates one potential embodiment of a write memory transaction 304. The write transaction 304 includes data 308 and the secure enclave bit 306. In the illustrative embodiment, the data 308 includes eight data bits $d_1$ through $d_8$ and the enclave bit 306 includes a single bit E. Thus, in the illustrative embodiment the data 308 represents the binary value "01101011" and the enclave bit 306 is set and therefore indicates that the memory transaction 304 was originated by the processor 120 from a secure enclave. It should be understood that some embodiments, the computing device 100 may process a different number of data bits; for example, in some embodiments the data 308 may include 64 data bits d.

As described above in connection with block 506 of FIG. 5A, the computing device 100 may append the bit E to the data bits $d_1$ through $d_8$ and then generate an error correcting code 312 based on the combined data bits d and enclave bit E. The illustrative diagram 600 includes a resulting value 602 that includes the ECC 312, the data 308, and the enclave bit 306. As shown, the value 602 includes a parity bit $p_0$, four Hamming bits $p_1$, $p_2$, $p_4$, and $p_8$, the data bits $d_1$ through $d_8$, and the enclave bit E. The computing device 100 may use any appropriate technique to compute the Hamming bits. In some embodiments, for each Hamming bit the computing device 100 may set the Hamming bit if an odd number of a particular group of data bits are set, and clear the Hamming bit if an even number of those data bits are set. Table 1 illustrates the data bits that are used to determine each Hamming bit. For example, for bit $p_1$ the computing device 100 determines whether bits $d_1$, $d_2$, $d_4$, $d_5$, $d_7$, and E are set; for bit $p_2$ the computing device 100 determines whether bits $d_1$, $d_3$, $d_4$, $d_6$, and $d_7$ are set; and so on. The computing device 100 determines the parity bit p0 last, and may set the bit p0 if an odd number of the other bits are set or clear the bit p0 if an even number of the other bits are set. As shown, the value 602 generated for the data 308 and the enclave bit 306 is a thirteen-bit value "00000110010111."

TABLE 1

Illustrative calculation of Hamming code.

| | Bit Position | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| | $p_1$ | $p_2$ | $d_1$ | $p_4$ | $d_2$ | $d_3$ | $d_4$ | $p_8$ | $d_5$ | $d_6$ | $d_7$ | $d_8$ | E |
| $p_1$ | | | ✓ | | ✓ | | ✓ | | ✓ | | ✓ | | ✓ |
| $p_2$ | | | ✓ | | | ✓ | ✓ | | | ✓ | ✓ | | |
| $p_4$ | | | | | ✓ | ✓ | ✓ | | | | | ✓ | ✓ |
| $p_8$ | | | | | | | | | ✓ | ✓ | ✓ | ✓ | ✓ |
| $p_0$ | ✓ | ✓ | ✓ | ✓ | ✓ | ✓ | ✓ | ✓ | ✓ | ✓ | ✓ | ✓ | ✓ |

After generating the value 602 including the data 308, the ECC 312, and the enclave bit 306, as described above in connection with block 508 of FIG. 5A, the computing device 100 stores the data 308 and the ECC 312 to the memory 126. As shown in the diagram 600, the computing device 100 may remove the enclave bit 306 from the value 602 to generate the value 604 that includes the data 308 and the ECC 312. The computing device 100 stores the value 604 in the memory 126, without transmitting the enclave bit 306 to the memory 126.

Referring back to FIGS. 5A and 5B, as described above in connection with block 504, if the memory transaction 304 is not a write transaction (i.e., if it is a read transaction), the method 500 branches to block 510. In block 510, the computing device 100 reads the data 320 and the ECC 322 specified by the read memory transaction 304 from the memory 126. As described above, the data 320 and the ECC 322 may have been stored in the memory 126 by the computing device 100 in response to a previous memory transaction 304.

In block 512, the computing device 100 computes an error correcting code (ECC') 312 as a function of the data 320 read from the memory 126 and the enclave bit 306. For example, the computing device 100 may append the enclave bit 306 to the data 320 and calculate the ECC' 312 based on the combined bit values. The computing device 100 uses the same technique to calculate the ECC' 312 that is used to calculate the ECC 312 for write transactions 304, as described above in connection with block 506. Thus, in the illustrative embodiment the computing device 100 calculates the ECC' 312 using a SECDED scheme. In particular, for every 64 bits of data 320 and one bit of the enclave bit 306 (i.e., 65 total bits), the computing device 100 calculates an eight-bit ECC' 312 that includes seven bits of Hamming code and one bit of parity.

In block 514, the computing device 100 determines whether the calculated ECC' 312 equals the ECC 322 read from the memory 126. If so, the method 500 advances to block 516, in which the computing device 100 returns the data 320 and the ECC 322 read from the memory 126. Because the ECC' 312 matches the ECC 322, that means that the current memory transaction 304 originated with the same access intent as the previous memory transaction 304 that stored the data 320 and the ECC 322. In other words, both the current memory transaction 304 and the previous memory transaction 304 originated from a secure enclave or other secure execution mode of the processor 120, or both the current memory transaction 304 and the previous memory transaction 304 originated from a non-secure execution mode of the processor 120. In either of those circumstances, the current memory transaction 304 is allowed. After returning the data 320 and the ECC 322, the method 500 is completed. As described above in connection with FIG. 4, after processing the memory transaction 304, the computing device 100 may continue to process additional memory transactions 304. For example, the computing device 100 may perform eight read transactions 304 of sixty-four data bits each to read an entire cache line of 64 bytes.

Referring back to block 514, if the calculated ECC' 312 does not equal the ECC 322 read from the memory 126, then the method 500 branches ahead to block 518. If the ECC' 312 does not equal the ECC 322, then the current memory transaction 304 may have the incorrect access intent, or one or more bit errors may have occurred in the memory 126 (e.g., due to cosmic ray strikes or other errors). The computing device 100 may respond to this circumstance using any appropriate technique, such as generating a machine check exception or other error condition. In the illustrative embodiment, in block 518, the computing device 100 determines whether a bit error having an odd number of bits has occurred. The computing device 100 may determine whether an odd-bit error occurred, for example, by appending the enclave bit 306 to the data 320 and ECC 322 read from the memory 126 and determining whether the parity bit of the ECC 322 is correct for that combined value.

In block 520, the computing device 100 checks whether an odd-bit error has occurred. If so, the method 500 branches ahead to block 524, shown in FIG. 5B, to process the odd-bit error. If an odd-bit error has not occurred (i.e., if an even number of bit errors have occurred), the method 500 advances to block 522, in which the computing device 100 generates a machine check exception or other error condition. As described above, the ECCs 312, 322 used by the computing device 100 are calculated using a single-error correcting, double-error detecting scheme. Thus, even-bit errors having two or more bit errors are not correctable by the computing device 100. Two-bit errors that cause a machine check condition may include reads including two bit errors that occurred in the memory 126 or reads that include a single bit error that occurred in the memory 126 combined with an incorrect enclave bit 306. (Higher numbers of bit errors occurring in the memory 126 are possible but highly unlikely.) In other words, a detected two-bit error may indicate an attempt to access protected data from outside of a secure enclave combined with a bit error in the memory 126. After generating the machine check exception, the method 500 is completed. The computing device 100 may hang or otherwise cease execution in response to the machine check exception or other error condition.

Referring back to block 520, if an odd-bit error has occurred, the method 500 branches ahead to block 524, shown in FIG. 5B. In block 524, the computing device 100 determines the location of the bit error in the combined data 320 and enclave bit 306. For example, the computing device 100 may determine the Hamming bits within the ECC 322 that do not match the calculated Hamming bits of the calculated ECC' 312. The computing device 100 may add the bit positions of each erroneous Hamming bit to identify the location of the bit error.

In block 526, the computing device 100 determines whether the bit error occurred in the location of the enclave bit 306. If not, the method 500 branches ahead to block 530, described below. If the bit error occurred in the location of the enclave bit 306, the method 500 branches ahead to block 528, in which the computing device 100 generates a machine check exception or other error condition. The bit error identified in the enclave bit 306 indicates that the current memory transaction 304 has the wrong access intent. In other words, the current memory transaction 304 may be attempting to access data 320 from outside of a secure enclave, when the data 320 had originally been written by a previous memory transaction 304 that originated from within a secure enclave. Thus, the bit error in the location of the enclave bit 306 may indicate an attempted software attack, a programming error, and/or other vulnerability. After generating the machine check exception, the method 500 is completed. The computing device 100 may hang or otherwise cease execution in response to the machine check exception or other error condition. In some embodiments, the computing device 100 may perform any other appropriate security response to the potential software attack, such as logging the attack, alerting a user, performing appropriate page abort semantics, or performing another security response.

Referring back to block 526, if the bit error did not occur in the location of the enclave bit 306, then the method 500 branches ahead to block 530. In block 530, the computing device 100 attempts to correct the bit error(s) in the data 320 and the ECC 322. The computing device 100 may use any appropriate technique to correct the bit error(s). In block 532, the computing device 100 determines whether the bit error was successfully corrected. If corrected, the method 500 branches to block 536, described below. If not corrected, the method 500 branches to block 534.

In block 534, the computing device 100 the computing device 100 generates a machine check exception or other error condition. As described above, the ECCs 312, 322 used by the computing device 100 are computed using a single-error correcting, double-error detecting scheme. Thus, an odd-bit error that is not correctable indicates that three (or more) bit errors were detected, which are not correctable by the computing device 100. Three-bit errors that cause a machine check condition may include reads including three bit errors that occurred in the memory 126 (which is highly unlikely) or reads that include two bit errors that occurred in the memory 126 combined with an incorrect enclave bit 306. (Higher numbers of bit errors occurring in the memory 126 are possible but highly unlikely.) In other words, a three-bit error may indicate an attempt to access protected data from outside of a secure enclave combined with multiple bit errors in the memory 126. After generating the machine check exception, the method 500 is completed. The computing device 100 may hang or otherwise cease execution in response to the machine check exception or other error condition.

Referring back to block 532, if the bit error was successfully corrected, the method 500 branches to block 536, in which the computing device 100 returns the corrected data 320 and the corrected ECC 322 read from the memory 126. After returning the corrected data 320 and the corrected ECC 322, the method 500 is completed. As described above in connection with FIG. 4, after processing the memory transaction 304, the computing device 100 may continue to process additional memory transactions 304. For example, the computing device 100 may perform eight read transactions 304 of sixty-four data bits each to read an entire cache line of 64 bytes.

It should be understood that in certain rare circumstances, returning the correcting data 320 and the corrected ECC 322 in block 536 may cause the computing device 100 to allow a memory transaction 304 with an incorrect access intent. In particular, the SECDED ECC scheme used in the illustrative embodiment may be unable to distinguish between a correctable one-bit error and an uncorrectable three-bit error. For example, when the memory transaction 304 is associated with an incorrect enclave bit 306 (e.g., a transaction 304 originating from outside a secure enclave attempts to access secure data 320) and the memory read includes two error bits (e.g., two erroneous bits from the memory 126), the computing device 100 may detect an odd-numbered bit error (i.e., three error bits) and, in certain circumstances, that error may be apparently corrected by the computing device 100. If so, then the computing device 100 may allow the transaction 304 even though the enclave bit 306 is incorrect. Of course, the bit errors would change the data 308, and if the data 308 is encrypted, then it is highly unlikely that the modified data 308 could be successfully decrypted. Additionally, the likelihood of the computing device 100 accepting an incorrect access intent is extremely low. For example, as described above, the computing device 100 may be required to perform eight consecutive read transactions 304 of 64 data bits in order to read a single 64-byte cache line. If the probability of a 2-bit error in the data 308 is p, then the probability of eight consecutive, apparently correctable 2-bit errors P is less than $p^8$, because not all 2-bit errors (combined with an incorrect enclave access bit 306) appear to be correctable. If the probability p is less than or equal to $2^{-16}$, which has been confirmed by industrial data, then the probability P is less than or equal to $2^{-128}$. In other words, the likelihood of accepting an incorrect access intent for the cache line is less than the probability of guessing a 128-bit encryption key.

Figure 7:
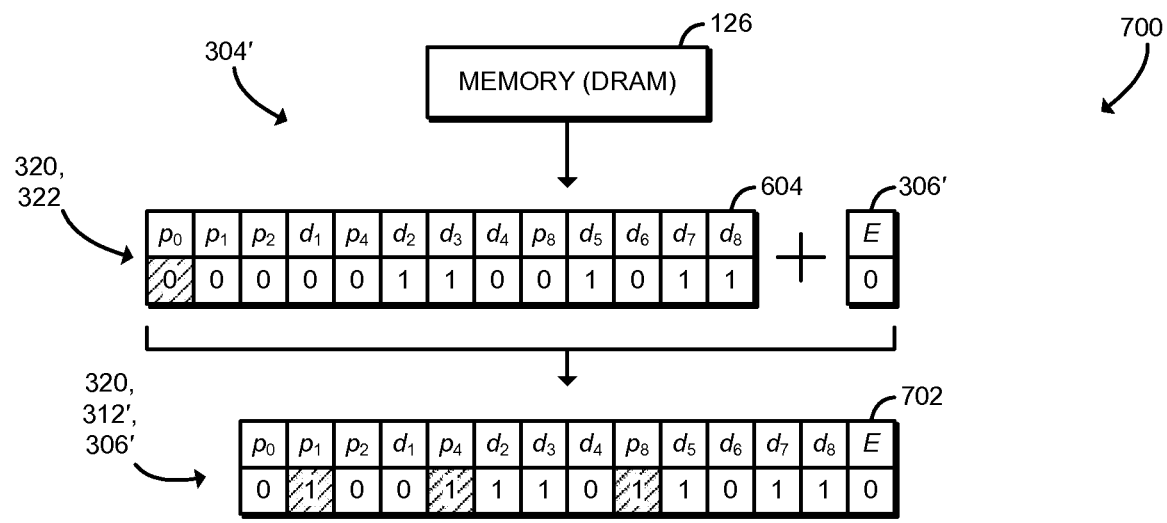
FIG. 7 is a schematic diagram illustrating another memory transaction that may be processed by the methods of FIGS. 4, 5A, and 5B.

Referring now to FIG. 7, a schematic diagram 700 illustrates one potential embodiment of a read memory transaction 304'. As shown, the read transaction 304' is associated with the secure enclave bit 306'. The secure enclave bit 306' is cleared, indicating that the read transaction 304' was originated by the processor 120 outside of a secure enclave or otherwise outside of a secure execution mode. As described above in connection with block 510 of FIG. 5A, the computing device 100 reads the value 604 from the memory 126. The value 604 includes the data 320 and the ECC 322 stored in the memory 126. As shown, the value 604 is the same value 604 stored in the memory 126 by the write transaction 304 illustrated in FIG. 6.

The computing device 100 appends the enclave bit 306' to the value 604 and checks the global parity bit $p_0$. As shown, the parity bit $p_0$ is incorrect, indicating that an odd number of bit errors have occurred, as described above in connection with block 518 of FIG. 5A. The computing device 100 also generates the ECC' 312 based on the data 320 (i.e., the data bits $d_0$ through $d_8$ of the value 604) and the enclave bit 306', as described above in connection with block 512 of FIG. 5A. As shown, the value 702 includes the data 320, the ECC' 312, and the enclave bit 306'. As shown, the ECC 322 (i.e., the bits $p_0$ through $p_8$ of the value 604) and the ECC' 312 (i.e., the bits $p_0$ through $p_8$ of the value 702) do not match. In particular, the bits $p_1$, $p_4$, and $p_8$ of the ECCs 312', 322 do not match. As described above in connection with block 524 of FIG. 5B, the sum of the bit position of the non-matching bits (i.e., 1+4+8) is 13, which is the bit position of the enclave bit 306'. Therefore, the computing device 100 has detected an incorrect access intent, that is, that the read transaction 304' is associated with the incorrect enclave bit 306'. The computing device 100 may generate a machine check exception or other error condition, as described above in connection with block 528 of FIG. 5B.

It should be appreciated that, in some embodiments, any one or more of the methods 400 and/or 500 may be embodied as various instructions stored on a computer-readable media, which may be executed by the processor 120, a peripheral device 132, and/or other components of a computing device 100 to cause the computing device 100 to perform the corresponding method 400 and/or 500. The computer-readable media may be embodied as any type of media capable of being read by the computing device 100 including, but not limited to, the memory 126, the data storage 128, a local memory of the processor 120, firmware and/or microcode of the processor 120, and/or other memory or data storage devices of the computing device 100, portable media readable by a peripheral device 132 of the computing device 100, and/or other media.

EXAMPLES

Illustrative examples of the technologies disclosed herein are provided below. An embodiment of the technologies may include any one or more, and any combination of, the examples described below.

Example 1 includes a computing device for secure memory access, the computing device comprising a processor; and a memory external to the processor; wherein the processor comprises a secure execution module to originate, by the processor, a memory transaction and an associated secure enclave status bit, wherein the secure enclave status bit is indicative of whether the memory transaction is originated by the processor in a secure execution mode; an error-correcting code module to compute a first error-correcting code as a function of memory transaction data and the secure enclave status bit, wherein the memory transaction data is associated with the memory transaction; and a memory operation module to perform the memory transaction based on the first error-correcting code and the memory transaction data with the memory of the computing device.

Example 2 includes the subject matter of Example 1, and wherein the memory transaction data comprises a first number of bits and the first number of bits is less than a maximum number of data bits supported by the error-correcting code.

Example 3 includes the subject matter of any of Examples 1 and 2, and wherein to compute the first error-correcting code as a function of the memory transaction data and the secure enclave status bit comprises to calculate a single-error correction and double-error detection (SECDED) error-correcting code.

Example 4 includes the subject matter of any of Examples 1-3, and wherein the memory transaction data comprises sixty-four bits and the error-correcting code comprises seven bits of Hamming code and one bit of parity.

Example 5 includes the subject matter of any of Examples 1-4, and wherein the secure execution mode comprises a secure enclave execution mode.

Example 6 includes the subject matter of any of Examples 1-5, and wherein to originate the memory transaction and the associated secure enclave status bit comprises to determine, by the processor, whether the memory transaction is originated by the processor from a secure enclave; set, by the processor, the secure enclave status bit in response to a determination that the memory transaction is originated by the processor from the secure enclave; and clear, by the processor, the secure enclave status bit in response to a determination that the memory transaction is not originated by the processor from the secure enclave.

Example 7 includes the subject matter of any of Examples 1-6, and wherein to originate the memory transaction and the associated secure enclave status bit further comprises to perform, by the processor, an encryption operation with the memory transaction data in response to the determination that the memory transaction is originated by the processor from the secure enclave.

Example 8 includes the subject matter of any of Examples 1-7, and wherein to perform the memory transaction comprises to (i) determine whether the memory transaction is a write transaction, and (ii) write, in response to a determination that the memory transaction is a write transaction, the memory transaction data and the error-correcting code to the memory of the computing device; and to compute the first error-correcting code as a function of the memory transaction data and the secure enclave status bit comprises to compute, in response to the determination that the memory transaction is a write transaction, the first error-correcting code as a function of the memory transaction data included in the memory transaction and the secure enclave status bit.

Example 9 includes the subject matter of any of Examples 1-8, and wherein to perform the memory transaction comprises to (i) determine whether the memory transaction is a read transaction, (ii) read, in response to a determination that the memory transaction is a read transaction, the memory transaction data and a second error-correcting code that correspond to the memory transaction from the memory of the computing device, and (iii) determine whether the first error-correcting code matches the second error-correcting code; and to compute the first error-correcting code as a function of the memory transaction data and the secure enclave status bit comprises to compute, in response to the determination that the memory transaction is a read transaction, the first error-correcting code as a function of the memory transaction data that corresponds to the memory transaction and the secure enclave status bit.

Example 10 includes the subject matter of any of Examples 1-9, and wherein to perform the memory transaction further comprises to return the memory transaction data and the second error-correcting code in response to a determination that the first error-correcting code matches the second error-correcting code.

Example 11 includes the subject matter of any of Examples 1-10, and wherein to perform the memory transaction further comprises to determine whether a bit error has occurred in a bit position that corresponds to the secure enclave status bit in response to a determination that that the first error-correcting code does not match the second error-correcting code; and generate a error condition in response to a determination that the bit error has occurred in the bit position that corresponds to the secure enclave status bit.

Example 12 includes the subject matter of any of Examples 1-11, and wherein the error condition comprises a machine check exception.

Example 13 includes the subject matter of any of Examples 1-12, and wherein to perform the memory transaction further comprises to determine whether an odd-numbered bit error has occurred based on the first error-correcting code and the second error-correcting code in response to the determination that the first error-correcting code does not match the second error-correcting code; and generate an error condition in response to a determination that an odd-numbered bit error has not occurred; wherein to determine whether the bit error has occurred in the bit position that corresponds to the secure enclave status bit comprises to determine whether the bit error has occurred in the bit position that corresponds to the secure enclave status bit in response to a determination that that an odd-numbered bit error has occurred.

Example 14 includes the subject matter of any of Examples 1-13, and wherein to perform the memory transaction further comprises to attempt to correct the bit error in the memory transaction data and the second error-correcting code to generate a corrected memory transaction data and a corrected second error-correcting code in response to a determination that the bit error has not occurred in the bit position that corresponds to the secure enclave status bit; determine whether the bit error was corrected in response to an attempt to correct the bit error; generate an error condition in response to a determination that the bit error was not corrected; and return the corrected memory transaction data and the corrected second error-correcting code in response to a determination that the bit error was corrected.

Example 15 includes a method for secure memory access, the method comprising originating, by a processor of a computing device, a memory transaction and an associated secure enclave status bit, wherein the secure enclave status bit is indicative of whether the memory transaction is originated by the processor in a secure execution mode; computing a first error-correcting code as a function of memory transaction data and the secure enclave status bit, wherein the memory transaction data is associated with the memory transaction; and performing the memory transaction based on the first error-correcting code and the memory transaction data using a memory of the computing device, wherein the memory is external to the processor.

Example 16 includes the subject matter of Example 15, and wherein the memory transaction data comprises a first number of bits and the first number of bits is less than a maximum number of data bits supported by the error-correcting code.

Example 17 includes the subject matter of any of Examples 15 and 16, and wherein computing the first error-correcting code as a function of the memory transaction data and the secure enclave status bit comprises calculating a single-error correction and double-error detection (SECDED) error-correcting code.

Example 18 includes the subject matter of any of Examples 15-17, and wherein the memory transaction data comprises sixty-four bits and the error-correcting code comprises seven bits of Hamming code and one bit of parity.

Example 19 includes the subject matter of any of Examples 15-18, and wherein the secure execution mode comprises a secure enclave execution mode.

Example 20 includes the subject matter of any of Examples 15-19, and wherein originating the memory transaction and the associated secure enclave status bit comprises determining, by the processor, whether the memory transaction is originated by the processor from a secure enclave; setting, by the processor, the secure enclave status bit in response to determining that the memory transaction is originated by the processor from the secure enclave; and clearing, by the processor, the secure enclave status bit in response to determining that the memory transaction is not originated by the processor from the secure enclave.

Example 21 includes the subject matter of any of Examples 15-20, and wherein originating the memory transaction and the associated secure enclave status bit further comprises performing, by the processor, an encryption operation with the memory transaction data in response to determining that the memory transaction is originated by the processor in the secure execution mode.

Example 22 includes the subject matter of any of Examples 15-21, and wherein performing the memory transaction comprises (i) determining whether the memory transaction is a write transaction, and (ii) writing, in response to determining that the memory transaction is a write transaction, the memory transaction data and the error-correcting code to the memory of the computing device; and computing the first error-correcting code as a function of the memory transaction data and the secure enclave status bit comprises computing, in response to determining that the memory transaction is a write transaction, the first error-correcting code as a function of the memory transaction data included in the memory transaction and the secure enclave status bit.

Example 23 includes the subject matter of any of Examples 15-22, and wherein performing the memory transaction comprises (i) determining whether the memory transaction is a read transaction, (ii) reading, in response to determining that the memory transaction is a read transaction, the memory transaction data and a second error-correcting code corresponding to the memory transaction from the memory of the computing device, and (iii) determining whether the first error-correcting code matches the second error-correcting code; and computing the first error-correcting code as a function of the memory transaction data and the secure enclave status bit comprises computing, in response to determining that the memory transaction is a read transaction, the first error-correcting code as a function of the memory transaction data corresponding to the memory transaction and the secure enclave status bit.

Example 24 includes the subject matter of any of Examples 15-23, and wherein performing the memory transaction further comprises returning the memory transaction data and the second error-correcting code in response to determining that the first error-correcting code matches the second error-correcting code.

Example 25 includes the subject matter of any of Examples 15-24, and wherein performing the memory transaction further comprises determining whether a bit error has occurred in a bit position corresponding to the secure enclave status bit in response to determining that that the first error-correcting code does not match the second error-correcting code; and generating an error condition in response to determining that the bit error has occurred in the bit position corresponding to the secure enclave status bit.

Example 26 includes the subject matter of any of Examples 15-25, and wherein generating the error condition comprises generating a machine check exception.

Example 27 includes the subject matter of any of Examples 15-26, and wherein performing the memory transaction further comprises determining whether an odd-numbered bit error has occurred based on the first error-correcting code and the second error-correcting code in response to determining that the first error-correcting code does not match the second error-correcting code; and generating an error condition in response to determining that an odd-numbered bit error has not occurred; wherein determining whether the bit error has occurred in the bit position corresponding to the secure enclave status bit comprises determining whether the bit error has occurred in the bit position corresponding to the secure enclave status bit in response to determining that that an odd-numbered bit error has occurred.

Example 28 includes the subject matter of any of Examples 15-27, and wherein performing the memory transaction further comprises attempting to correct the bit error in the memory transaction data and the second error-correcting code to generate a corrected memory transaction data and a corrected second error-correcting code in response to determining that the bit error has not occurred in the bit position corresponding to the secure enclave status bit; determining whether the bit error was corrected in response to attempting to correct the bit error; generating an error condition in response to determining that the bit error was not corrected; and returning the corrected memory transaction data and the corrected second error-correcting code in response to determining that the bit error was corrected.

Example 29 includes a computing device comprising a processor; and a memory having stored therein a plurality of instructions that when executed by the processor cause the computing device to perform the method of any of Examples 15-28.

Example 30 includes one or more machine readable storage media comprising a plurality of instructions stored thereon that in response to being executed result in a computing device performing the method of any of Examples 15-28.

Example 31 includes a computing device comprising means for performing the method of any of Examples 15-28.

Example 32 includes a computing device for secure memory access, the computing device comprising means for originating, by a processor of the computing device, a memory transaction and an associated secure enclave status bit, wherein the secure enclave status bit is indicative of whether the memory transaction is originated by the processor in a secure execution mode; means for computing a first error-correcting code as a function of memory transaction data and the secure enclave status bit, wherein the memory transaction data is associated with the memory transaction; and means for performing the memory transaction based on the first error-correcting code and the memory transaction data using a memory of the computing device, wherein the memory is external to the processor.

Example 33 includes the subject matter of Example 32, and wherein the memory transaction data comprises a first number of bits and the first number of bits is less than a maximum number of data bits supported by the error-correcting code.

Example 34 includes the subject matter of any of Examples 32 and 33, and wherein the means for computing the first error-correcting code as a function of the memory transaction data and the secure enclave status bit comprises means for calculating a single-error correction and double-error detection (SECDED) error-correcting code.

Example 35 includes the subject matter of any of Examples 32-34, and wherein the memory transaction data comprises sixty-four bits and the error-correcting code comprises seven bits of Hamming code and one bit of parity.

Example 36 includes the subject matter of any of Examples 32-35, and wherein the secure execution mode comprises a secure enclave execution mode.

Example 37 includes the subject matter of any of Examples 32-36, and wherein the means for originating the memory transaction and the associated secure enclave status bit comprises means for determining, by the processor, whether the memory transaction is originated by the processor from a secure enclave; means for setting, by the processor, the secure enclave status bit in response to determining that the memory transaction is originated by the processor from the secure enclave; and means for clearing, by the processor, the secure enclave status bit in response to determining that the memory transaction is not originated by the processor from the secure enclave.

Example 38 includes the subject matter of any of Examples 32-37, and wherein the means for originating the memory transaction and the associated secure enclave status bit further comprises means for performing, by the processor, an encryption operation with the memory transaction data in response to determining that the memory transaction is originated by the processor in the secure execution mode.

Example 39 includes the subject matter of any of Examples 32-38, and wherein the means for performing the memory transaction comprises (i) means for determining whether the memory transaction is a write transaction, and (ii) means for writing, in response to determining that the memory transaction is a write transaction, the memory transaction data and the error-correcting code to the memory of the computing device; and the means for computing the first error-correcting code as a function of the memory transaction data and the secure enclave status bit comprises means for computing, in response to determining that the memory transaction is a write transaction, the first error-correcting code as a function of the memory transaction data included in the memory transaction and the secure enclave status bit.

Example 40 includes the subject matter of any of Examples 32-39, and wherein the means for performing the memory transaction comprises (i) means for determining whether the memory transaction is a read transaction, (ii) means for reading, in response to determining that the memory transaction is a read transaction, the memory transaction data and a second error-correcting code corresponding to the memory transaction from the memory of the computing device, and (iii) determining whether the first error-correcting code matches the second error-correcting code; and the means for computing the first error-correcting code as a function of the memory transaction data and the secure enclave status bit comprises means for computing, in response to determining that the memory transaction is a read transaction, the first error-correcting code as a function of the memory transaction data corresponding to the memory transaction and the secure enclave status bit.

Example 41 includes the subject matter of any of Examples 32-40, and wherein the means for performing the memory transaction further comprises means for returning the memory transaction data and the second error-correcting code in response to determining that the first error-correcting code matches the second error-correcting code.

Example 42 includes the subject matter of any of Examples 32-41, and wherein the means for performing the memory transaction further comprises means for determining whether a bit error has occurred in a bit position corresponding to the secure enclave status bit in response to determining that that the first error-correcting code does not match the second error-correcting code; and means for generating an error condition in response to determining that the bit error has occurred in the bit position corresponding to the secure enclave status bit.

Example 43 includes the subject matter of any of Examples 32-42, and wherein the means for generating the error condition comprises means for generating a machine check exception.

Example 44 includes the subject matter of any of Examples 32-43, and wherein the means for performing the memory transaction further comprises means for determining whether an odd-numbered bit error has occurred based on the first error-correcting code and the second error-correcting code in response to determining that the first error-correcting code does not match the second error-correcting code; and means for generating an error condition in response to determining that an odd-numbered bit error has not occurred; wherein the means for determining whether the bit error has occurred in the bit position corresponding to the secure enclave status bit comprises means for determining whether the bit error has occurred in the bit position corresponding to the secure enclave status bit in response to determining that that an odd-numbered bit error has occurred.

Example 45 includes the subject matter of any of Examples 32-44, and wherein the means for performing the memory transaction further comprises means for attempting to correct the bit error in the memory transaction data and the second error-correcting code to generate a corrected memory transaction data and a corrected second error-correcting code in response to determining that the bit error has not occurred in the bit position corresponding to the secure enclave status bit; means for determining whether the bit error was corrected in response to attempting to correct the bit error; means for generating an error condition in response to determining that the bit error was not corrected; and means for returning the corrected memory transaction data and the corrected second error-correcting code in response to determining that the bit error was corrected.

The invention claimed is:

1. A computing device for secure memory access, the computing device comprising:
   a processor; and
   a memory external to the processor;
   wherein the processor comprises:
      a secure execution module to originate, by the processor, a memory transaction and an associated secure enclave status bit, wherein the memory transaction is a read transaction, and wherein the secure enclave status bit is indicative of whether the memory transaction is originated by the processor in response to execution of secure code in a secure execution mode;
      an error-correcting code module to compute a first error-correcting code as a function of a combination of both memory transaction data and the secure enclave status bit, wherein the memory transaction data is associated with the memory transaction; and
      a memory operation module to perform the memory transaction based on the first error-correcting code and the memory transaction data with the memory of the computing device, wherein to perform the memory transaction comprises to (i) read the memory transaction data and a second error-correcting code that correspond to the memory transaction from the memory of the computing device, (ii) determine whether the first error-correcting code matches the second error-correcting code, (iii) determine whether a single bit error has occurred in a bit position that corresponds to the secure enclave status bit in response to a determination that the first error-correcting code does not match the second error-correcting code, and (iv) generate an error condition in response to a determination that a single bit error has occurred in the bit position that corresponds to the secure enclave status bit.

2. The computing device of claim 1, wherein the memory transaction data comprises a first number of bits and the first number of bits is less than a maximum number of data bits supported by the error-correcting code.

3. The computing device of claim 1, wherein to compute the first error-correcting code as a function of the memory transaction data and the secure enclave status bit comprises to calculate a single-error correction and double-error detection (SECDED) error-correcting code.

4. The computing device of claim 1, wherein the secure execution mode comprises a secure enclave execution mode, and wherein the secure code comprises a secure enclave.

5. The computing device of claim 1, wherein to originate the memory transaction and the associated secure enclave status bit comprises to:
   determine, by the processor, whether the memory transaction is originated by the processor from a secure enclave;
   set, by the processor, the secure enclave status bit in response to a determination that the memory transaction is originated by the processor from the secure enclave; and
   clear, by the processor, the secure enclave status bit in response to a determination that the memory transaction is not originated by the processor from the secure enclave.

6. The computing device of claim 1, wherein to perform the memory transaction further comprises to return the memory transaction data and the second error-correcting code in response to a determination that the first error-correcting code matches the second error-correcting code.

7. The computing device of claim 1, wherein
   to generate the error condition in response to the determination that the single bit error has occurred in the bit position that corresponds to the secure enclave status bit comprises to generate a security response.

8. The computing device of claim 7, wherein to perform the memory transaction further comprises to:
   determine whether an odd-numbered bit error has occurred based on the first error-correcting code and the second error-correcting code in response to the determination that the first error-correcting code does not match the second error-correcting code; and
   generate an error condition in response to a determination that an odd-numbered bit error has not occurred;
   wherein to determine whether the bit error has occurred in the bit position that corresponds to the secure enclave status bit comprises to determine whether the bit error has occurred in the bit position that corresponds to the secure enclave status bit in response to a determination that an odd-numbered bit error has occurred.

9. The computing device of claim 7, wherein to perform the memory transaction further comprises to:
   attempt to correct the bit error in the memory transaction data and the second error-correcting code to generate a corrected memory transaction data and a corrected second error-correcting code in response to a determination that the bit error has not occurred in the bit position that corresponds to the secure enclave status bit;

determine whether the bit error was corrected in response to an attempt to correct the bit error;

generate an error condition in response to a determination that the bit error was not corrected; and return the corrected memory transaction data and the corrected second error-correcting code in response to a determination that the bit error was corrected.

10. A method for secure memory access, the method comprising:

originating, by a processor of a computing device, a memory transaction and an associated secure enclave status bit, wherein the memory transaction is a read transaction, and wherein the secure enclave status bit is indicative of whether the memory transaction is originated by the processor in response to executing secure code in a secure execution mode;

reading memory transaction data and a second error-correcting code corresponding to the memory transaction from a memory of the computing device in response to originating the memory transaction, wherein the memory is external to the processor;

computing a first error-correcting code as a function of a combination of both the memory transaction data and the secure enclave status bit, wherein the memory transaction data is associated with the memory transaction;

determining whether the first error-correcting code matches the second error-correcting code;

determining whether a single bit error has occurred in a bit position that corresponds to the secure enclave status bit in response to determining that the first error-correcting code does not match the second error-correcting code; and generating an error condition in response to determining that a single bit error has occurred in the bit position that corresponds to the secure enclave status bit.

11. The method of claim 10, wherein the memory transaction data comprises a first number of bits and the first number of bits is less than a maximum number of data bits supported by the error-correcting code.

12. The method of claim 10, wherein computing the first error-correcting code as a function of the memory transaction data and the secure enclave status bit comprises calculating a single-error correction and double-error detection (SECDED) error-correcting code.

13. The method of claim 10, wherein the secure execution mode comprises a secure enclave execution mode, and wherein the secure code comprises a secure enclave.

14. The method of claim 10, wherein
generating the error condition in response to determining that the single bit error has occurred in the bit position that corresponds to the secure enclave status bit comprises generating a security response.

15. One or more non-transitory, computer-readable storage media comprising a plurality of instructions that in response to being executed cause a computing device to:

originate, by a processor of the computing device, a memory transaction and an associated secure enclave status bit, wherein the memory transaction is a read transaction, and wherein the secure enclave status bit is indicative of whether the memory transaction is originated by the processor in response to executing secure code in a secure execution mode;

read memory transaction data and a second error-correcting code corresponding to the memory transaction from a memory of the computing device in response to originating the memory transaction, wherein the memory is external to the processor;

compute a first error-correcting code as a function of a combination of both the memory transaction data and the secure enclave status bit, wherein the memory transaction data is associated with the memory transaction;

determine whether the first error-correcting code matches the second error-correcting code determine whether a single bit error has occurred in a bit position that corresponds to the secure enclave status bit in response to determining that the first error-correcting code does not match the second error-correcting code; and generate an error condition in response to determining that a single bit error has occurred in the bit position that corresponds to the secure enclave status bit.

16. The one or more non-transitory, computer-readable storage media of claim 15, wherein the memory transaction data comprises a first number of bits and the first number of bits is less than a maximum number of data bits supported by the error-correcting code.

17. The one or more non-transitory, computer-readable storage media of claim 15, wherein to compute the first error-correcting code as a function of the memory transaction data and the secure enclave status bit comprises to calculate a single-error correction and double-error detection (SECDED) error-correcting code.

18. The one or more non-transitory, computer-readable storage media of claim 15, wherein the secure execution mode comprises a secure enclave execution mode, and wherein the secure code comprises a secure enclave.

19. The one or more non-transitory, computer-readable storage media of claim 15, wherein
to generate the error condition in response to determining that the single bit error has occurred in the bit position that corresponds to the secure enclave status bit comprises to generate a security response.

* * * * *